US007065322B2

(12) United States Patent
Peng

(10) Patent No.: US 7,065,322 B2

(45) Date of Patent: Jun. 20, 2006

(54) WIRELESS COMMUNICATION APPARATUS WITH BUILT-IN TERMINAL HUB

(75) Inventor: Morris Peng, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 786 days.

(21) Appl. No.: 09/920,813

(22) Filed: Aug. 3, 2001

(65) Prior Publication Data

US 2002/0094779 A1 Jul. 18, 2002

(30) Foreign Application Priority Data

Jan. 17, 2001 (TW) .............................. 90200929 U

(51) Int. Cl.
*H04B 5/00* (2006.01)
*H04M 1/00* (2006.01)

(52) U.S. Cl. ......................................... 455/41; 379/430

(58) Field of Classification Search ................ 379/430; 370/310; 455/41

See application file for complete search history.

(56) References Cited

U.S. PATENT DOCUMENTS

| | | | | |
|---|---|---|---|---|
| 6,373,942 | B1 * | 4/2002 | Braund | 379/430 |
| 6,452,910 | B1 * | 9/2002 | Vij et al. | 370/310 |

* cited by examiner

*Primary Examiner*—Wing Chan
*Assistant Examiner*—Thjuan P. Knowlin
(74) *Attorney, Agent, or Firm*—Rabin & Berdo, P.C.

(57) ABSTRACT

A wireless communication apparatus with built-in terminal hub for transmitting a wireless signal includes a PCB, built-in antenna module and input terminal hub. The built-in antenna module disposed on the PCB transmits the wireless signal and the input terminal hub coupled with the PCB connects the computer. It avoids bringing the surrounding electromagnetic interference (EMI) and disorder. Besides, the built-in antenna module makes the whole size smaller and easy to carry. The wireless communication apparatus further provides an extended output terminal hub for connecting other peripheral device.

21 Claims, 4 Drawing Sheets

WIRELESS COMMUNICATION APPARATUS WITH BUILT-IN TERMINAL HUB

This application incorporates by reference Taiwan application Serial No. 90200929, filed Jan. 17, 2001.

BACKGROUND OF THE INVENTION

1. Field of the Invention

The invention relates in general to a wireless communication apparatus, and more particularly to a wireless communication apparatus with built-in terminal hub.

2. Description of the Related Art

In the information age, the computer plays an important role and brings great convenience for modern people. Especially for the minimized notebook computer, people can use it any time, any place due to its portability.

However, people who accustomed to use mouse feel uncomfortable by using the touchpad and trackball of the notebook to control the movement of the cursor or pointer on a display screen. Therefore, they prefer to connect a mouse 104 external to the notebook computer 102. A schematic diagram of a traditional notebook computer connecting a mouse is shown in FIG. 1. The space for controlling the mouse 104 is limited by the constraint due to the connection of the notebook computer 102. Besides, it is disorderly and inconvenient when several people use mice on the same table at the meeting.

In order to solve the problem of the limited space for using the mouse 104, a wireless transmission concept is introduced and a cordless mouse and wireless transceiver are thus devised. It provides users unconstrained space for controlling the cordless mouse without the mouse connecting wire 106. The signal is directly sent by the cordless mouse to the wireless transceiver and then sent to the notebook computer by the wireless transceiver. The implementation is stated as follows:

Referring to FIG. 2, a schematic diagram of a traditional notebook computer equipped with a cordless mouse and a wireless transceiver is shown. As shown in FIG. 2, the wireless transceiver 204 connects the notebook computer 202 by the cable 208 and the terminal hub 210. The wireless transceiver 204 is capable of transmitting the wireless signal. The terminal hub 210 can be a USB (Universal Series Bus) terminal hub or PS2 terminal hub. The external antenna 212 of the wireless transceiver 204 receives the wireless signal sent by the cordless mouse 206. The wireless signal is thus transmitted through the wireless transceiver 204, cable 208, and terminal hub 210 to the notebook computer 202 for performing. Besides, the notebook computer 202 communicates with an outer computer equipped another wireless transceiver by means of the wireless transceiver. For example, people employ the wireless transceiver to proceed one-way or two-way transmission among the notebook computers at meeting.

Although the wireless transceiver 204 facilitate the communication between computers, it gives rise to some negative problems, which are listed in the following:

(1) The cable 208 becomes an antenna due to the high control frequency of the notebook computer 202. The cable 208 brings the surrounding electromagnetic interference (EMI) from the notebook computer 202 and causes antenna effect.

(2) It is disorderly and inconvenient when several people use mice with cables 208 on the same table at the meeting.

(3) The wireless transceiver 204 is too large and heavy to carry. Besides, the attached cable 208 and external antenna 212 take up a lot of space.

(4) Generally speaking, notebook computer 202 merely has single terminal hub 210. There is no more terminal hub 210 available to connect the peripheral device while the wireless transceiver 204 connects the notebook computer 202 by means of the cable 208 and terminal hub 210.

SUMMARY OF THE INVENTION

It is therefore an object of the invention to provide a wireless communication apparatus with built-in terminal hub. It avoids bringing the surrounding electromagnetic interference (EMI) from the computer and causing antenna effect since there is no need to connect a cable. Besides, replacing the external antenna by the built-in antenna reduces the space that the external antenna occupies and solves the problem about the disorder and inconvenience. Moreover, the built-in antenna module makes the whole size smaller and easy to carry. It also provides an extended output terminal hub for connecting other peripheral device.

The invention achieves the above-identified objects by providing a wireless communication apparatus with built-in terminal hub for transmitting a wireless signal. The apparatus includes a PCB (Printed Circuit Board), built-in antenna module and input terminal hub. The built-in antenna module disposed on the PCB transmits the wireless signal and the input terminal hub coupled with the PCB connects the computer.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

The wireless communication apparatus with built-in terminal hub according to the invention directly connect the computer by means of the terminal hub without the cable. It avoids bringing the surrounding electromagnetic interference (EMI). Besides, replacing the external antenna by the built-in antenna reduces the space that the external antenna occupies.

Figure 1:
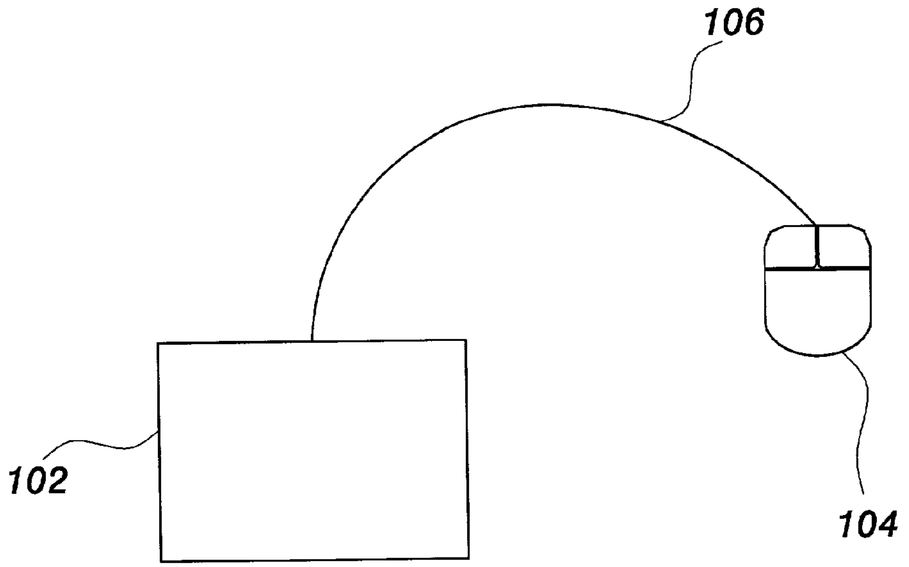
FIG. 1 PRIOR ART
FIG. 1 (Prior Art) shows a schematic diagram of a traditional notebook computer connecting a mouse.
Figure 2:
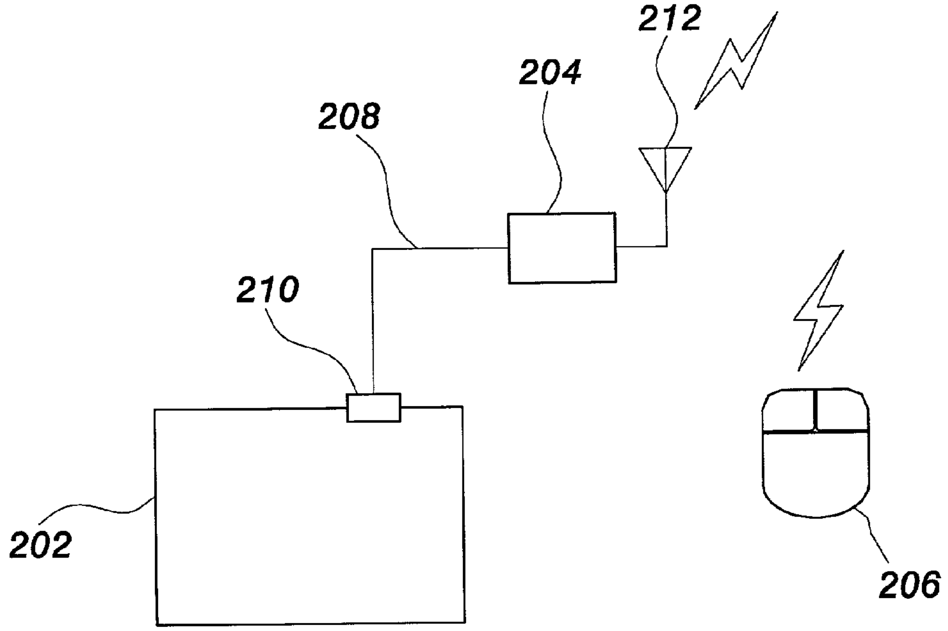
FIG. 2 PRIOR ART
FIG. 2 (Prior Art) shows a schematic diagram of a traditional notebook computer equipped with a cordless mouse and a wireless transceiver.
Figure 3:
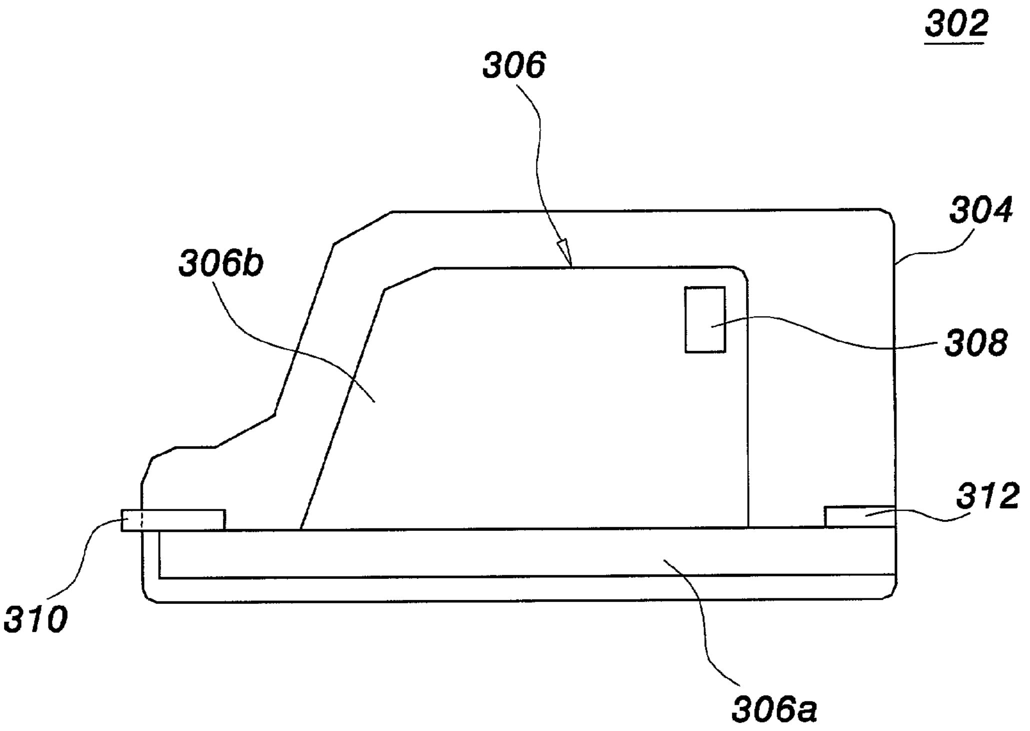
FIG. 3 shows a side view of a wireless communication apparatus with built-in terminal hub according to a preferred embodiment of the invention.

Referring to FIG. 3, a side view of a wireless communication apparatus with built-in terminal hub according to a preferred embodiment of the invention is shown. The wireless communication apparatus 302 includes a casing 304, PCB (Printed Circuit Board) 306, built-in antenna module 308, input terminal hub 310 and output terminal hub. The wireless communication apparatus is capable of transmitting a wireless signal. The PCB 306 has a bottom member 306*a* and an erect member 306*b*. The input terminal hub 310 and output terminal hub 312 are disposed on two ends of the bottom member 306*a* respectively and coupled with the bottom member 306*a*. The wireless communication apparatus 302 is coupled with the computer by means of the input terminal hub. Moreover, the built-in antenna module 308 for transmitting the wireless signal is disposed on and coupled with the erect member 306*b*. The casing 304 contains the PCB 306 and the built-in antenna module 308 to protect the configuration inside the wireless communication apparatus 302 from interference.

Figure 4A:
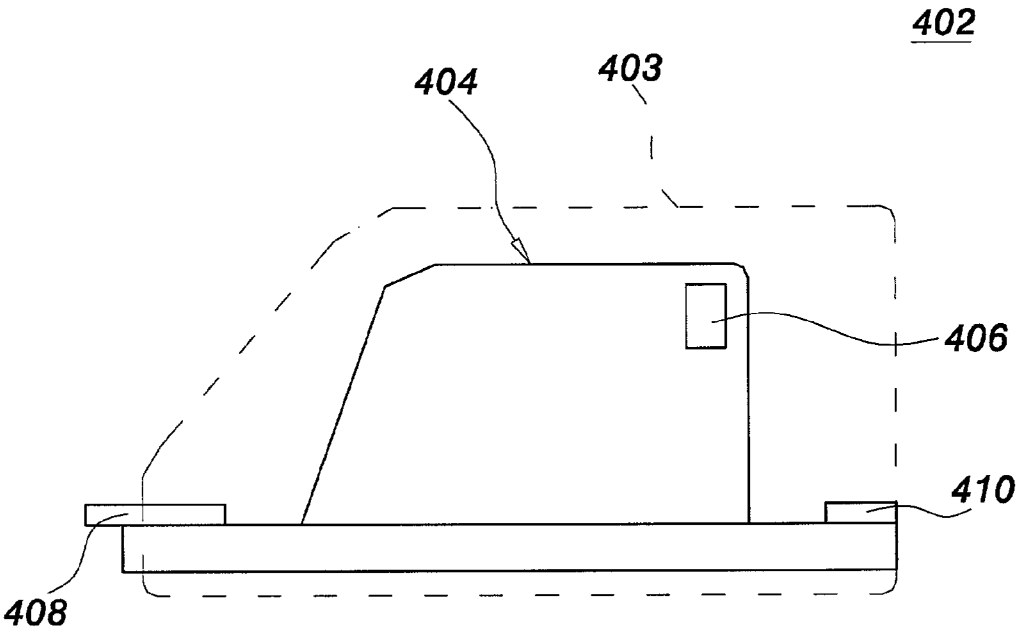
FIG. 4A shows a side view of an application of the wireless communication apparatus of FIG. 3.
Figure 4B:
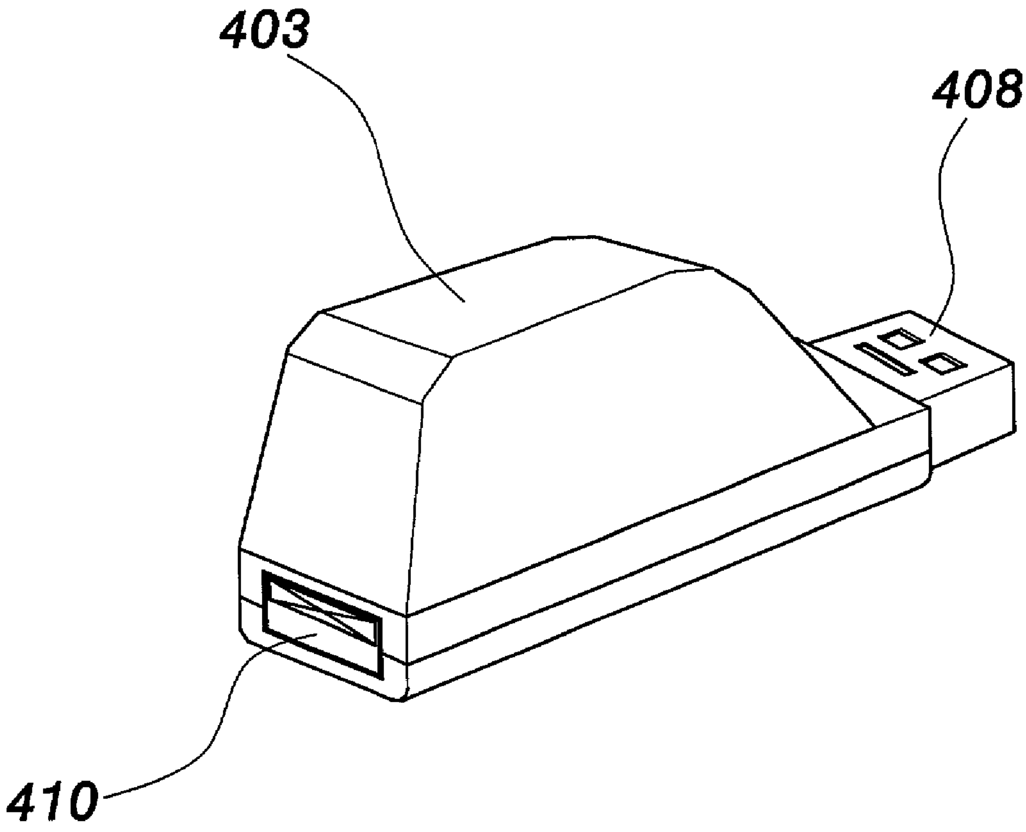
FIG. 4B shows a perspective view of the wireless communication apparatus of FIG. 4A.

As shown in FIG. 3, the input terminal hub 310 is a USB (Universal Series Bus) or PS2 terminal hub while the output terminal hub 310 is a USB or PS2 terminal hub. The built-in antenna module 308 is a phase matrix antenna module. The phase matrix antenna module is designed by an aluminum foil of a baseboard. Moreover, the transmission of the wireless communication apparatus 302 can be a one-way or two-way signal transmission. Referring to FIG. 4A~4B, a side view and a perspective view of an application of the wireless communication apparatus of FIG. 3 are shown. The wireless communication apparatus 402 includes a casing 403, PCB 404, USB input terminal hub 408, USB output terminal hub 410 and phase matrix antenna.

Figure 4C:
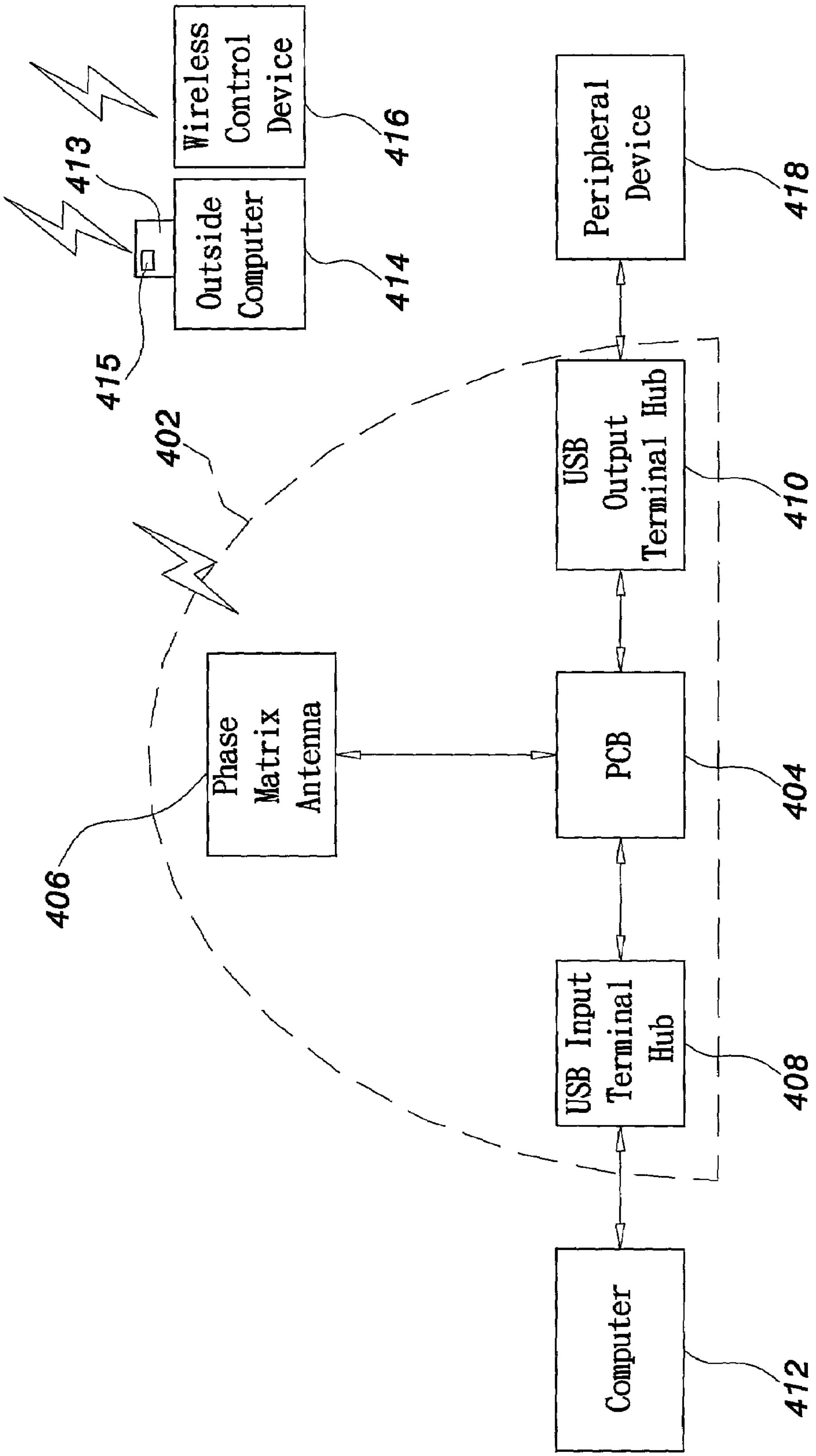
FIG. 4C shows a block diagram of a computer having the wireless communication apparatus of FIG. 4A coupling with an outer computer, wireless control device and peripheral device.

Referring to FIG. 4C, a block diagram of a computer having the wireless communication apparatus of FIG. 4A coupling with an outer computer, wireless control device and peripheral device is shown. The wireless communication apparatus 402, which is enveloped by the dotted line in the FIG. 4C, includes a PCB 404, phase matrix antenna 406, USB input terminal hub 408, and USB output terminal hub 410. The phase matrix antenna 406 is disposed on the PCB and the USB input terminal hub 408 as well as the USB output terminal hub 41 are coupled with the PCB. The computer 412 uses the phase matrix antenna 406 of the wireless communication apparatus 402 to communicate with an outside computer 414 equipped with another wireless communication apparatus 413 or receive the wireless signal from a wireless control device 416. Besides, the peripheral device 418 connects the computer 412 by the coupling with the USB output terminal hub 410 of the wireless communication apparatus 418. The computer 412 and the outside computer 414 can be personal computers, notebook computers, laptop computers or hand-held computers. The wireless control device 416 can be a cordless mouse or a wireless keyboard. And the peripheral device 418 can be a scanner, printer, or fax machine.

After the computer 412 sends a wireless signal to a wireless communication apparatus 402, the wireless signal is transmitted through the USB input terminal hub 408 as well as the PCB 404. The wireless signal is then transmitted to the outside computer 414 by the communication between the phase matrix antenna 406 on the PCB 404 and the phase matrix antenna 415 of the wireless communication apparatus 413. By the same way, the outside computer 414 can transmits another wireless signal to the computer 412 by the communication between the wireless communication apparatus 402 and 415 wherein the wireless communication apparatus 402 and 415 could have the same configuration.

As for the wireless control device 416, the wireless signal sent from the wireless control device 416 is received by the phase matrix antenna 406 and then transmitted to the computer 412 though the PCB 404 and the USB input terminal hub 408 for performing.

On the other hand, the computer 412 sends a command signal to the wireless communication apparatus 402. The command signal is transmitted to the peripheral device 418 through the USB input terminal hub 408, PCB, and USB output terminal hub 410 for performing.

Therefore, The computer 412 is able to have a wireless communication with the outside computer 414 and the wireless control device 416 is able to transmit a wireless signal to the computer 412 by the connection with the wireless communication apparatus having an built-in antenna module 308. Coupled with the peripheral device 418 by means of the output terminal hub 312, the computer 412 can transmit a command signal to the peripheral device 418. In addition, the wireless communication apparatus 302 can be one-way 2.4 GHz multiple-channel FM/FSK receiver, two-way 900 MHz/2.4 GHz spread spectrum transceiver, or regenerative low power-consumption one-way receiver. Furthermore, the wireless communication apparatus 302 can employs a Bluetooth solution.

The wireless communication apparatus according to the preferred embodiment of the invention has the following advantages:

(1) The wireless communication apparatus directly connects the computer by means of the built-in terminal hub without the cable. It avoids bringing the surrounding electromagnetic interference (EMI) from the computer and causing antenna effect even if the operating frequency of the computer is high. Besides, replacing the external antenna by the built-in antenna reduces the space that the external antenna occupies.

(2) It solves the problem about the disorder and inconvenience caused by the traditional wireless transceiver.

(3) The wireless communication apparatus without a cable is smaller in size and easy to carry since the antenna module is built-in.

(4) The wireless communication apparatus with built-in terminal hub provides an extended output terminal hub for connecting other peripheral device.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. In combination:

(a) a computer including a computer terminal hub and lacking any wireless communications capability;

(b) a wireless computer-control device; and (c) a wireless communication apparatus, connecting with the computer in a direct manner and communicating with the wireless computer-control device by radio; the wireless communication apparatus further comprising:

a casing;

a PCB (Printed Circuit Board) contained inside the casing;

a built-in antenna module disposed on the PCB for transmitting the wireless signal to the wireless computer-control device;

a first terminal hub on the casing coupled with the PCB inside the casing and connected to the computer terminal hub in a direct manner, whereby the computer communicates with the PCB; and a second terminal hub on the casing coupled with the PCB inside the casing, whereby another peripheral device mated to the second terminal hub is operatively communicated with the computer terminal hub;

whereby, a single terminal hub of the computer communicates with both wired and wireless peripheral devices.

2. The wireless communication apparatus according to claim 1, wherein the wireless computer-control device is a cordless mouse or a wireless keyboard.

3. The wireless communication apparatus according to claim 1, wherein the first terminal hub is a USB (Universal Series Bus) terminal hub or a PS2 terminal hub.

4. The wireless communication apparatus according to claim 2, wherein the second terminal hub is a USB (Universal Series Bus) terminal hub or a PS2 terminal hub.

5. The wireless communication apparatus according to claim 1, wherein the transmission of the wireless communication apparatus is a one-way signal transmission.

6. The wireless communication apparatus according to claim 1, wherein the transmission of the wireless communication apparatus is a two-way signal transmission.

7. The wireless communication apparatus according to claim 1, wherein the wireless communication apparatus is a one-way 2.4 GHz multiple-channel FM/FSK receiver.

8. The wireless communication apparatus according to claim 1, wherein the wireless communication apparatus is a regenerative low power-consumption one-way receiver.

9. The wireless communication apparatus according to claim 1, wherein the wireless communication apparatus is a two-way 900 MHz/2.4 GHz spread spectrum transceiver.

10. The wireless communication apparatus according to claim 1, further including a Bluetooth solution.

11. The wireless communication apparatus according to claim 1, wherein the built-in antenna module is a phase matrix antenna module.

12. The wireless communication apparatus according to claim 11, wherein the phase matrix antenna module comprises an aluminum foil of a baseboard.

13. A wireless communication apparatus for a computer lacking any wireless communications capability, the apparatus comprising:

a casing;

a PCB (Printed Circuit Board) inside the casing;

an input terminal hub, on the casing, coupled with the PCB;

an output terminal hub, on the casing, operatively connected to the input terminal hub; and a built-in antenna module disposed on the PCB for transmitting and/or receiving wireless data to and/or from the input terminal hub from and/or to a wireless control device;

whereby, a single terminal hub of the computer communicates with both wired and wireless peripheral devices.

14. The wireless communication apparatus according to claim 13, wherein the wireless control device is a cordless mouse or a wireless keyboard.

15. The wireless communication apparatus according to claim 13, wherein the transmission of the wireless communication apparatus is a one-way signal transmission or a two-way signal transmission.

16. The wireless communication apparatus according to claim 15, wherein the wireless communication apparatus is a one-way 2.4 GHz multiple-channel FM/FSK receiver.

17. The wireless communication apparatus according to claim 15, wherein the wireless communication apparatus is a regenerative low power-consumption one-way receiver.

18. The wireless communication apparatus according to claim 15, wherein the wireless communication apparatus is a two-way 900 MHz/2.4 GHz spread spectrum transceiver.

19. The wireless communication apparatus according to claim 15, furthering including a Bluetooth solution.

20. The wireless communication apparatus according to claim 13, wherein the built-in antenna module is a phase matrix antenna module.

21. The wireless communication apparatus according to claim 20, wherein the phase matrix antenna module comprises an aluminum foil of a baseboard.

* * * * *